United States Patent [19]
Liang

[11] Patent Number: 6,082,510
[45] Date of Patent: Jul. 4, 2000

[54] SUPPORTING DEVICE FOR A WHEELED SUITCASE

[76] Inventor: Sung-Ming Liang, No. 21, Lane 169 Fu-Shan St., Chang-Hua City, Taiwan

[21] Appl. No.: 09/225,483

[22] Filed: Jan. 6, 1999

Related U.S. Application Data

[63] Continuation-in-part of application No. 08/808,633, Feb. 28, 1997, Pat. No. 5,873,439.

[51] Int. Cl.$^7$ ..................................................... A45C 5/14
[52] U.S. Cl. .............................. 190/18 A; 190/39; 16/34; 280/43.1
[58] Field of Search .................................... 190/18 A, 39; 16/34; 280/37, 43.1

[56] References Cited

U.S. PATENT DOCUMENTS

| | | | |
|---|---|---|---|
| 3,842,953 | 10/1974 | Royet | 190/18 A |
| 4,087,102 | 5/1978 | Sprague | 190/18 A X |
| 4,097,955 | 7/1978 | Foge et al. | 190/18 A X |
| 4,397,062 | 8/1983 | Huang | 190/12 A X |
| 4,575,109 | 3/1986 | Cowdery | 190/18 A X |
| 4,588,055 | 5/1986 | Chen | 190/18 A |
| 4,773,123 | 9/1988 | Yu | 190/18 A X |
| 5,519,919 | 5/1996 | Lee | 16/115 |
| 5,568,848 | 10/1996 | Liang | 190/18 A |
| 5,873,439 | 2/1999 | Liang | 190/18 A |

FOREIGN PATENT DOCUMENTS

| | | | |
|---|---|---|---|
| 2751184 | 8/1978 | Germany | 16/34 |

*Primary Examiner*—Sue A. Weaver
*Attorney, Agent, or Firm*—Sughrue, Mion, Zinn Macpeak & Seas, PLLC

[57] ABSTRACT

A supporting device for a wheeled suitcase includes a positioning member, a leg member, a locking unit and a biasing member. The positioning member is mounted on a back wall of the suitcase, and has a mounting wall in a longitudinal direction, and a positioning unit disposed on an upper end of the mounting wall to extend in a first transverse direction. The positioning unit has a pivot member that extends in the first transverse direction. The leg member is pivoted to the pivot member at the upper end so as to turn therearound to an operative inclined position, or so as to move toward the mounting wall in order to be folded thereto. The leg member defines an opening for access to the mounting wall. The locking unit is disposed to be accessible via the opening, and includes a retaining member and an engaging tongue disposed on the mounting wall and the leg member, respectively. The engaging tongue can be brought in a second transverse direction to engage the retaining member when the leg member is at the folded position. At the folded position, the biasing member biases the engaging tongue to engage the retaining member.

7 Claims, 8 Drawing Sheets

SUPPORTING DEVICE FOR A WHEELED SUITCASE

CROSS-REFERENCE OF RELATED APPLICATION

This invention is a Continuation-in-Part of U.S. patent application Ser. No. 08/808,633 which was filed on Feb. 28, 1997 now U.S. Pat. No. 5,873,439.

BACKGROUND OF THE INVENTION

1. Field of the Invention

The invention relates to a supporting device, more particularly to a supporting device for a wheeled suitcase.

2. Description of the Related Art

A conventional wheeled suitcase includes a suitcase body and a handle member. The handle member is mounted on a back wall of the suitcase body in a longitudinal direction, and can be pulled outwardly in the longitudinal direction so as to project beyond an upper end of the suitcase body when in use. Casters are mounted rotatably on a lower end of the suitcase body.

Some disadvantages of the aforesaid wheeled suitcase reside in that, prior to movement, the suitcase body must be inclined or tilted forward, and when stopping, the suitcase body must be disposed uprightly relative to the ground, thereby inconveniencing the user.

SUMMARY OF THE INVENTION

Therefore, the object of this invention is to provide a wheeled suitcase with a supporting device which permits the suitcase body to be disposed in an operative inclined position so as to avoid the disadvantages that are generally associated with the conventional wheeled suitcase.

Accordingly, a supporting device of this invention is adapted for use in a wheeled suitcase which includes a suitcase body having a back wall with first upper and lower ends spaced apart from each other in a longitudinal direction, a caster unit disposed at the first lower end for rolling on the ground, and a handle attached to the first upper end so as to extend in the longitudinal direction. The supporting device includes a positioning member adapted to be mounted on the back wall of the suitcase body, and having a mounting wall that extends in the longitudinal direction to form a first distal portion and a first proximate portion relative to the caster unit, and a positioning unit disposed on the first distal portion distal to the first upper end so as to extend in a first transverse direction. The positioning unit has a pivot member which extends along the first transverse direction. A leg member has a second upper end mounted pivotally on the pivot member for turning thereabout to move the same to an operative inclined position relative to the mounting wall in a second transverse direction when the back wall is tilted for forward movement of the suitcase body, or to move the leg member toward the mounting wall in the second transverse direction to a folded position where the back wall rests substantially vertically. The leg member has a bottom wheel adapted to roll on the ground when the leg member is at the operative inclined position, a rear wall that faces the mounting wall, and a front wall opposite to the rear wall in the second transverse direction and defining an opening between the second upper end and the bottom wheel for access to the mounting wall. A locking unit is disposed to be accessible via the opening in the leg member, and includes a retaining member and an engaging tongue disposed on the rear wall and the mounting wall, respectively. The engaging tongue is disposed to be brought in the second transverse direction to engage the retaining member once the leg member is moved to the folded position. A first biasing member is disposed to bias the engaging tongue to engage and be retained in the retaining member.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENTS

Referring to FIGS. 1, 2, 3 and 4, the preferred embodiment of a supporting device of this invention is shown to be adapted for use with a wheeled suitcase. The wheeled suitcase includes a suitcase body 40 which has a back wall 401 with first upper and lower ends 402, 403 spaced apart from each other in a first longitudinal direction, a caster unit 29 disposed at the first lower end 403 for rolling on the ground, and a handle 30 attached to the first upper end 402 and extending in the first longitudinal direction. The preferred embodiment includes a positioning member 10, a leg member 20, a locking unit, and a first biasing member 144.

As illustrated, the positioning member 10 is mounted on the back wall 401 of the suitcase body 40 (see FIG. 4), and has a mounting wall 14 that extends in the first longitudinal direction to form a first distal portion 13 and a first proximate portion 11 relative to the caster unit 29, and a positioning unit 153 disposed on the first distal portion 13 distal to the first upper end 402 and extending in a first transverse direction. The positioning unit 153 has a pivot member 152 that extend along the first transverse direction.

Figure 1:
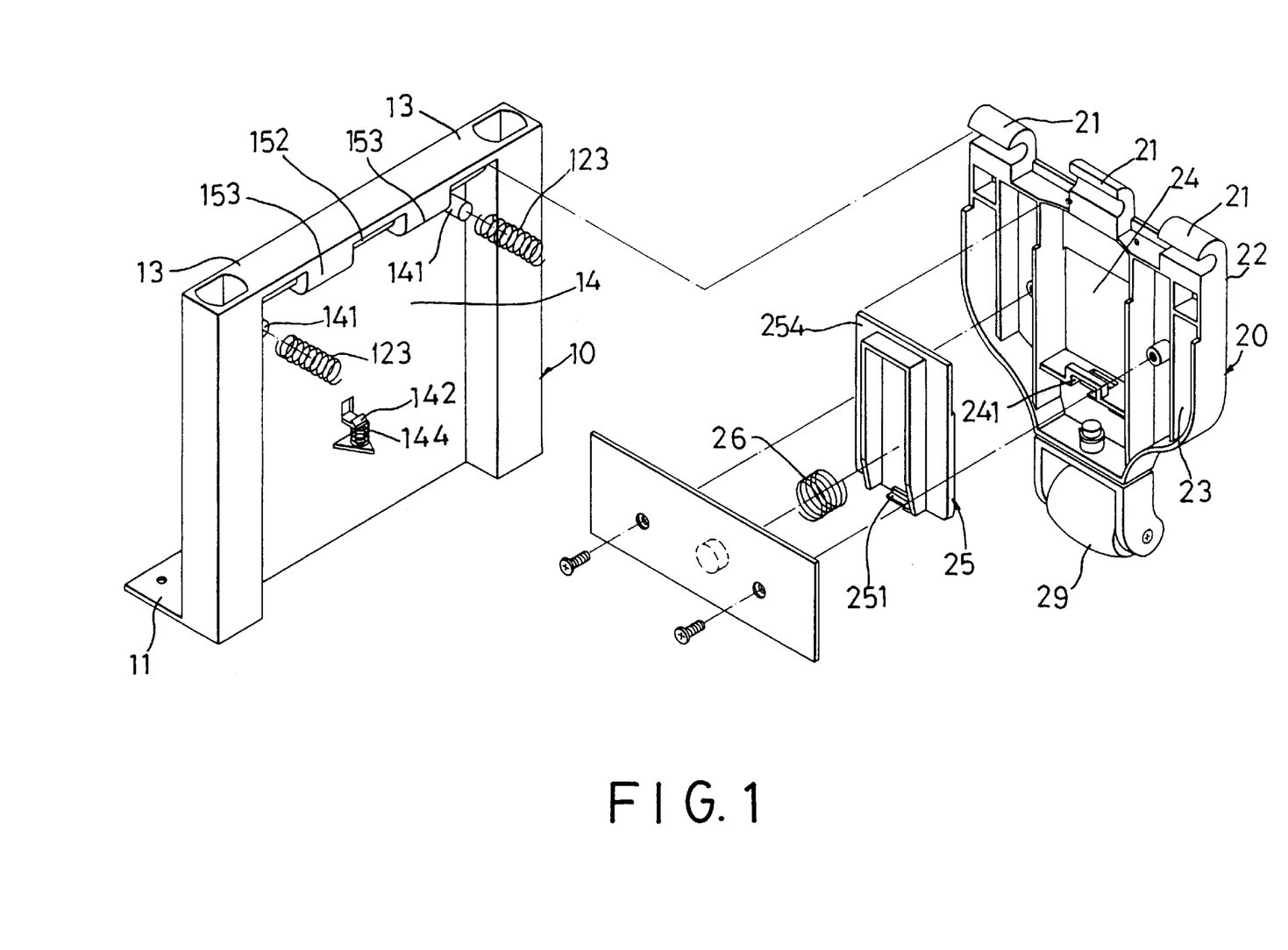
FIG. 1 is an exploded view of a preferred embodiment of a supporting device of this invention for use with a wheeled suitcase.
Figure 2:
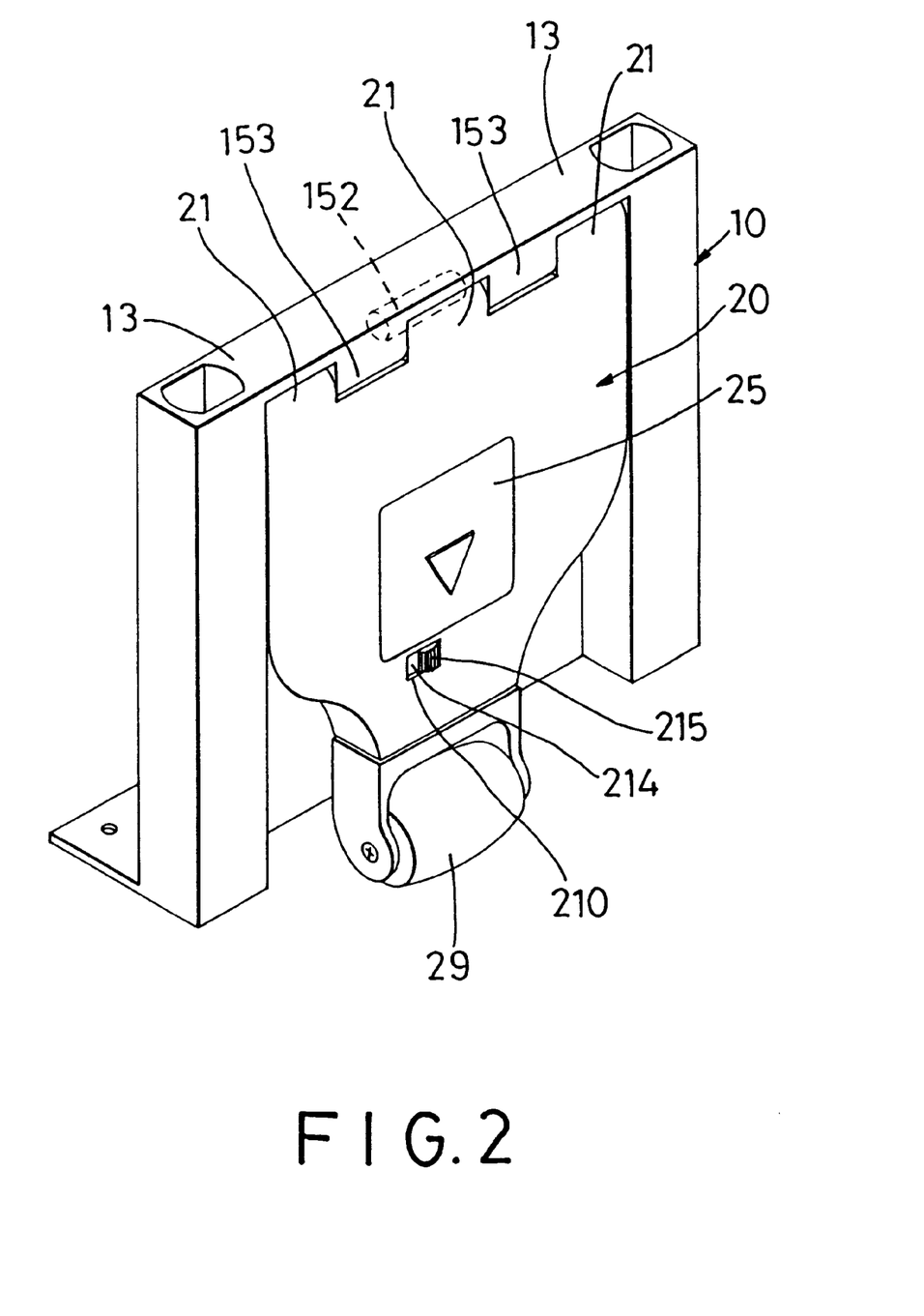
FIG. 2 is a perspective view of the preferred embodiment in a folded position.
Figure 3:
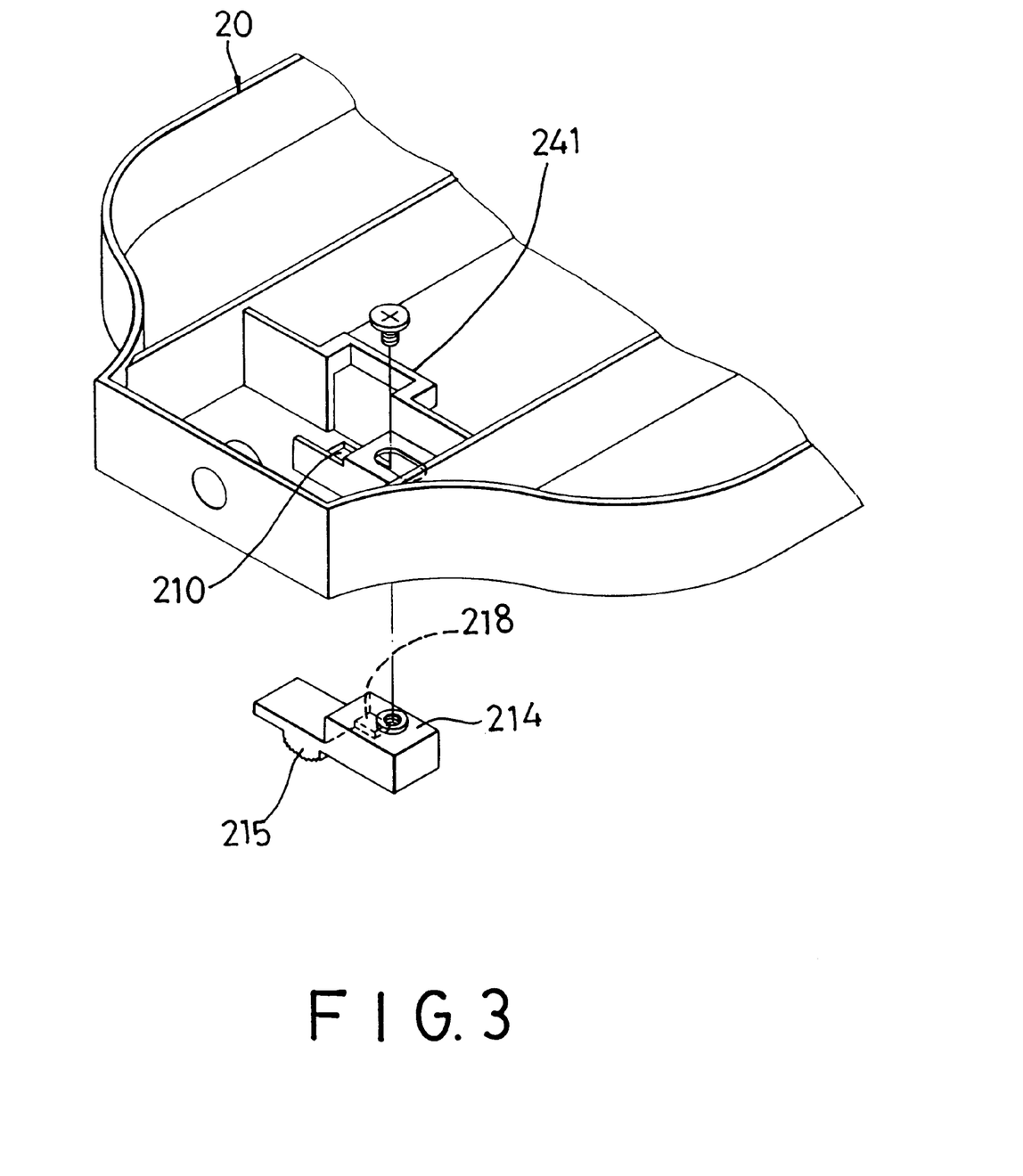
FIG. 3 is an enlarged fragmentary view of a leg member employed in the preferred embodiment.
Figure 4:
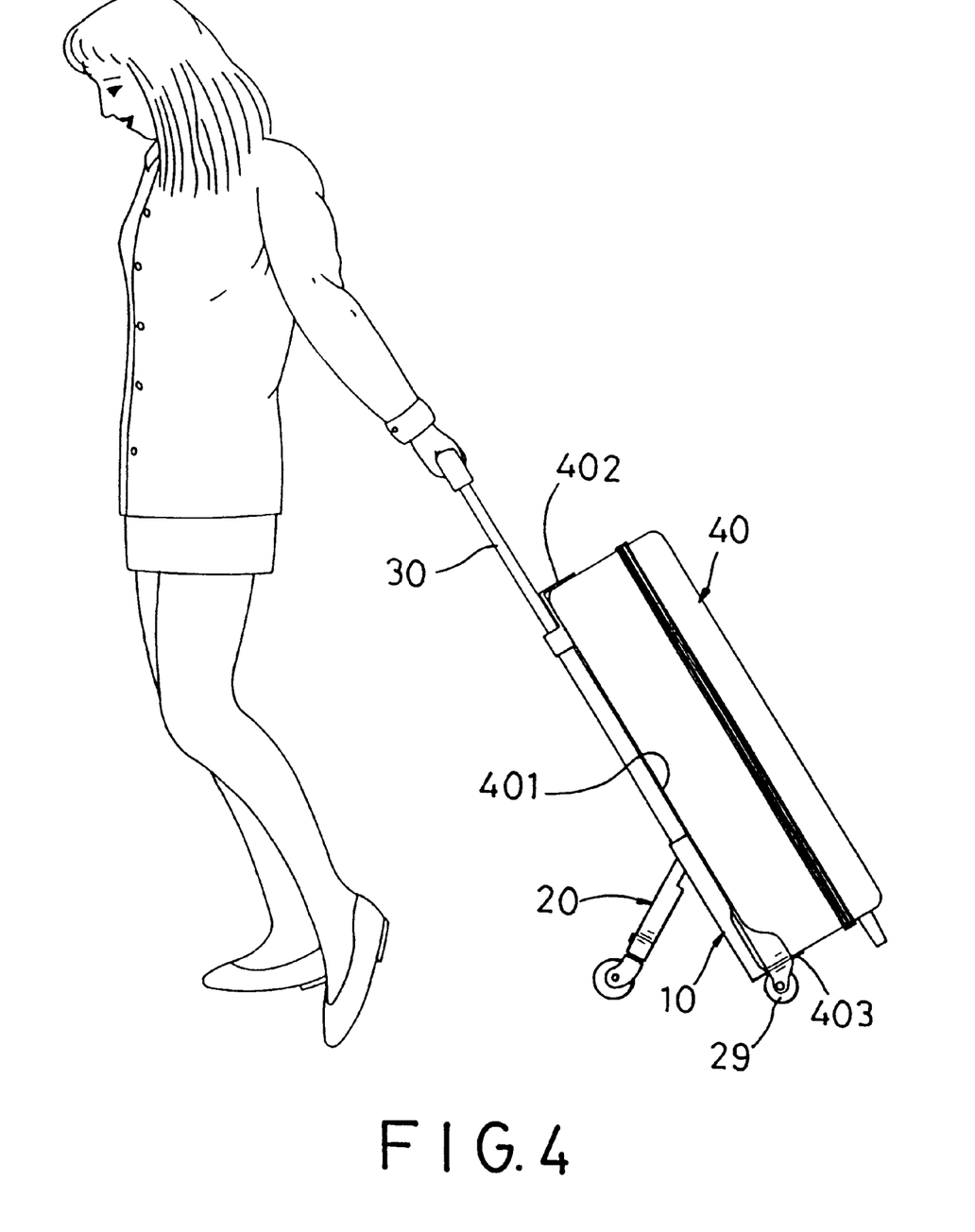
FIG. 4 is a perspective view of the preferred embodiment when mounted on a wheeled suitcase.

The leg member 20 has a second upper end 21 mounted pivotally on the pivot member 152 for turning thereabout to move the leg member 20 to an operative inclined position relative to the mounting wall 14 in a second transverse direction when the back wall 401 is tilted for forward movement of the suitcase body 40, or to move the leg member 20 toward the mounting wall 14 in the second transverse direction to a folded position, where the back wall 401 rests substantially vertically. The leg member 20 has a bottom wheel 29 adapted to roll on the ground when the leg member 20 is at the operative inclined position, a rear wall 23 that faces the mounting wall 14, and a front wall 22 that is disposed opposite to the rear wall 23 in the second transverse direction and that defines an opening 24 between the second upper end 21 and the bottom wheel 29 for access to the mounting wall 14.

The locking unit is disposed to be accessible via the opening 24, and includes a retaining member 241 and an engaging tongue 142 disposed on the rear wall 23 and the mounting wall 14, respectively. The engaging tongue 142 is disposed to be brought in the second transverse direction to engage and be retained in the retaining member 241 once the leg member 20 is moved to the folded position.

The first biasing member 144 is disposed to bias the engaging tongue 142 to engage and be retained in the retaining member 241.

The preferred embodiment further includes a lock releasing member 25 disposed to be received in and movable relative to the opening 24 in the second transverse direction. The lock releasing member 25 has a depressing portion 251 disposed to be brought to depress the engaging tongue 142 against biasing action of the first biasing member 144 when the lock releasing member 25 is moved toward the mounting wall 14 in the second transverse direction. A second biasing member 26 is disposed to bias the lock releasing member 25 toward the front wall 22 in the second transverse direction. In this embodiment, the retaining member 241 is disposed on the rear wall 23, whereas the engaging tongue 142 is disposed on the mounting wall 14. Preferably, the bottom wheel 29 is swiveled relative to the second upper end 21. A pair of third biasing members 123 are disposed around two posts 141 fixed on the mounting wall 14 to bias the leg member 20 to the operative inclined position. The lock releasing member 25 has a faceplate 254 extending out of the opening 24 and frontward of the front wall 22 and of such a dimension so as to cover the opening 24 such that the faceplate 254 can be pressed from an exterior of the leg member 20 in order to move inwardly toward the mounting wall 14.

Figure 5:
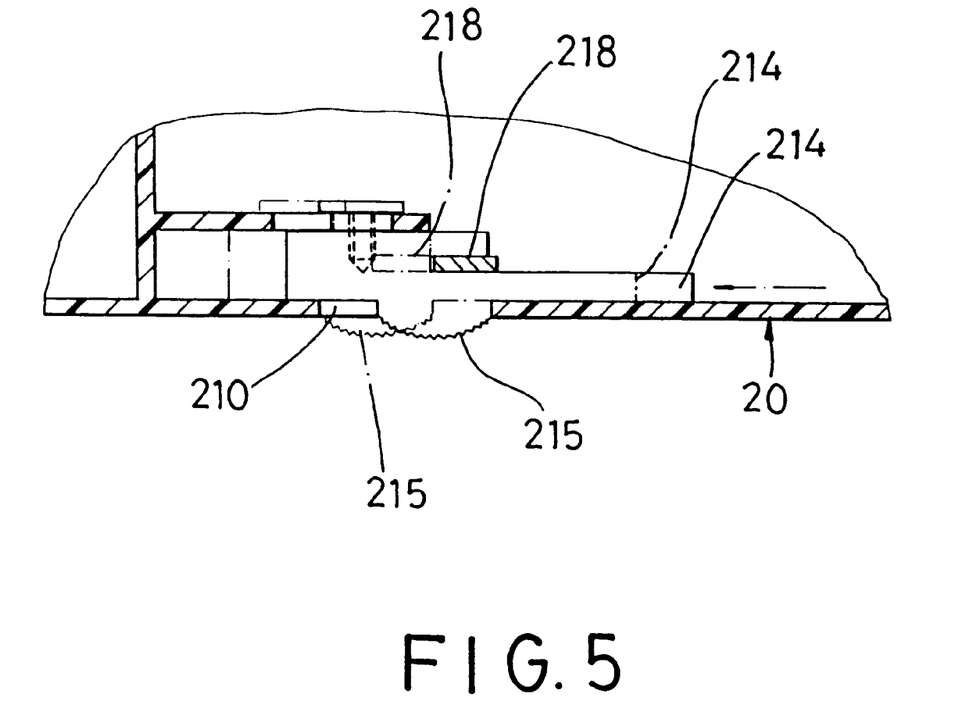
FIG. 5 is a fragmentary sectional view of the leg member employed in the preferred embodiment.

Referring FIGS. 3 and 5, a latch member 214 is disposed on the rear wall 23 of the leg member 20 at an elevation below the opening 24, and is movable in the first transverse direction between a first position (shown in dotted lines), where the latch member 214 is disposed to be aligned with the lock releasing member 25 in the second transverse direction and permits the depression portion 251 to be latched in the latch hole 218 of the latch member 214, thereby preventing pressing of the depressing portion 251, and a second position (shown in the solid lines), where the latch member 214 is cleared away from the depressing portion 251 to permit pressing of the latter against the biasing action of the first biasing member 144. The leg member 20 has an elongate latch hole 210 formed through the front and rear walls 22, 23 in the first transverse direction. The latch member 214 further has an embossed portion 215 disposed to extend therefrom in the second transverse direction so as to protrude outwardly of the elongate latch hole 210 such that the embossed portion 215 can be shifted by the hand of the user to move the latch member 214 between the first and second positions.

Figure 6:
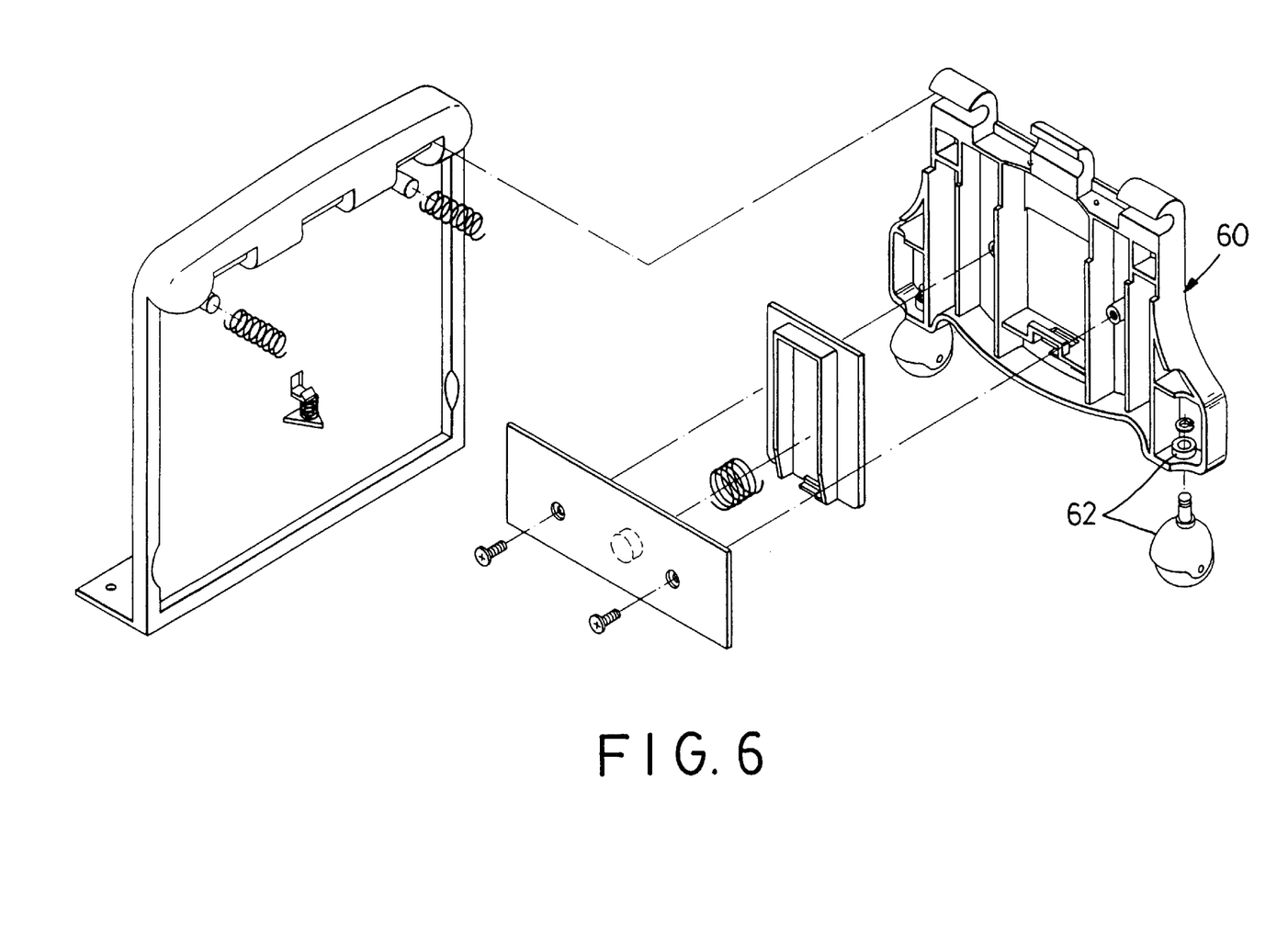
FIG. 6 is an exploded view of a modified preferred embodiment of this invention.
Figure 7:
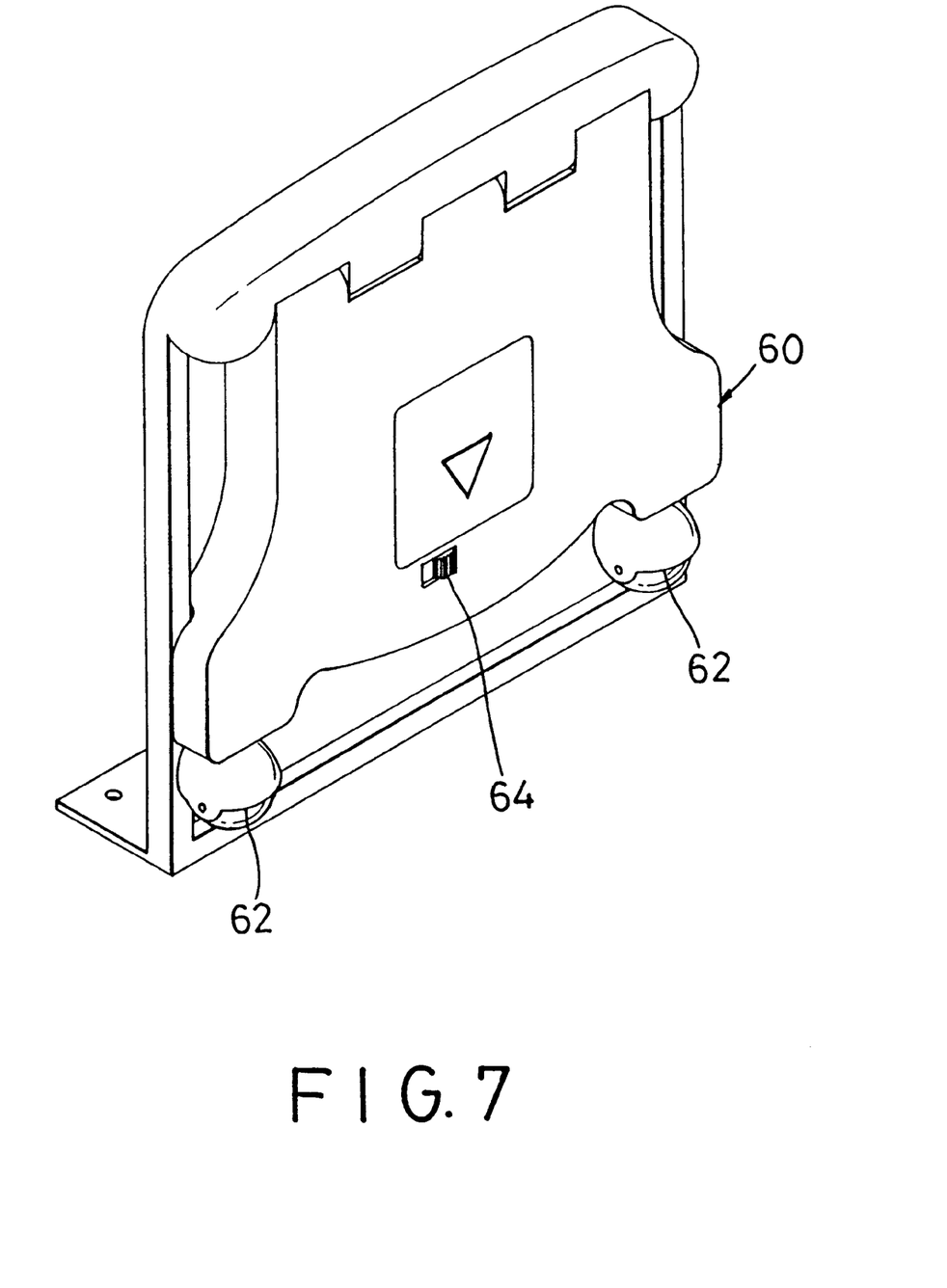
FIG. 7 is a perspective view of the modified preferred embodiment in a folded position.
Figure 8:
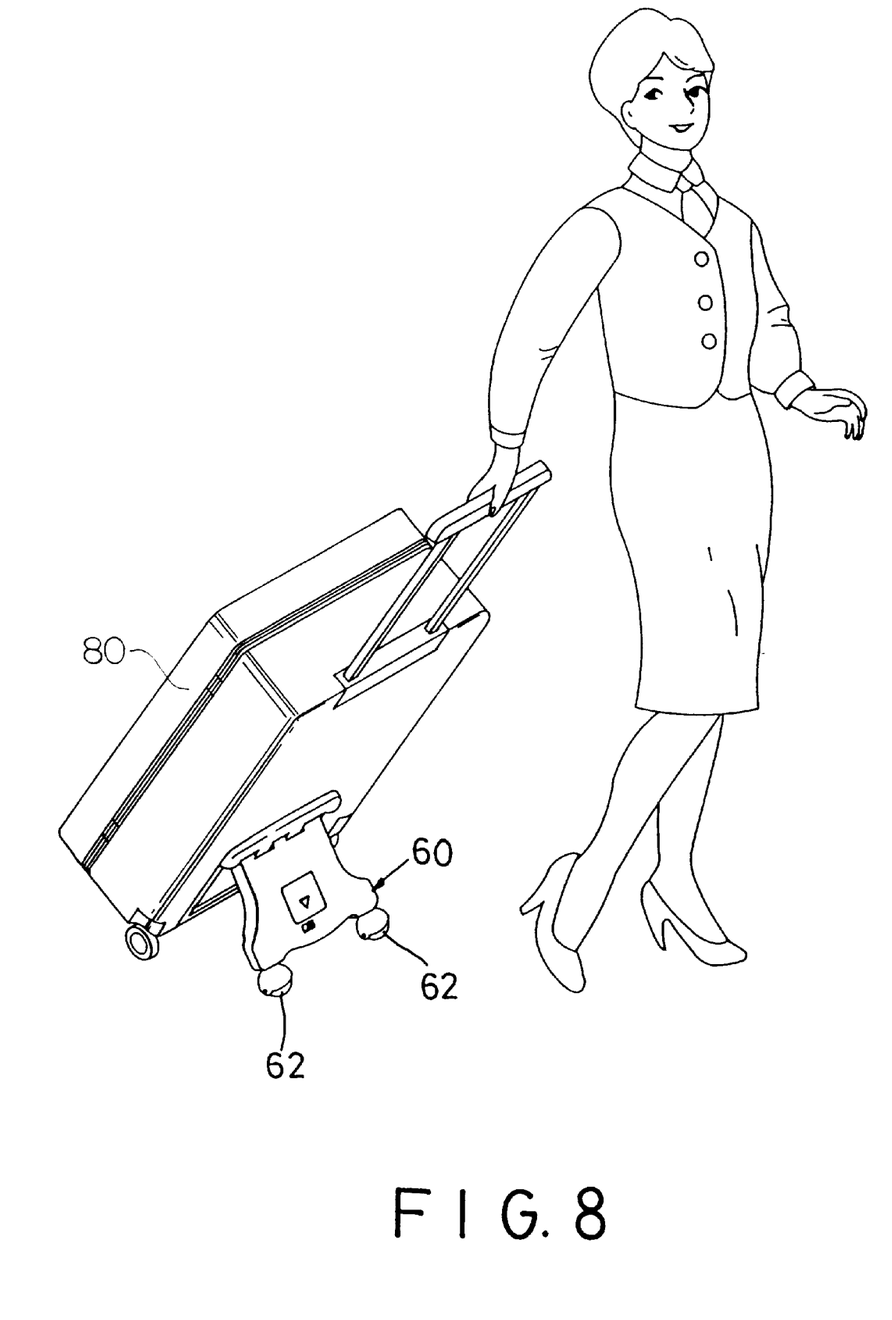
FIG. 8 is a perspective view of the modified preferred embodiment when mounted on a wheeled suitcase.

Referring to FIGS. 6, 7 and 8, a modified preferred embodiment of this invention is shown to be generally similar to the previous embodiment in structure, except in that two bottom wheels 62 are attached to the lower end of the leg member 60 so as to provide added stability when the suitcase body 80 is tilted forward to the operative inclined position, as best shown in FIG. 8.

As shown in FIG. 7, this embodiment includes an embossed portion 64 which is similar to the embossed portion 215 shown in FIG. 2.

With the invention thus explained, it is apparent that numerous modifications and variations can be made without departing from the scope and spirit of this invention. It is therefore intended that this invention be limited only as indicated in the appended claims.

I claim:

1. A supporting device for a wheeled suitcase, the wheeled suitcase including a suitcase body having a back wall with first upper and lower ends spaced apart from each other in a first longitudinal direction, a caster unit disposed at the first lower end for rolling on the ground, and a handle attached to the first upper end and extending in the first longitudinal direction, said supporting device comprising:

a positioning member adapted to be mounted on the back wall of the suitcase body, and having a mounting wall extending in the first longitudinal direction to form a first distal portion and a first proximate portion relative to the caster unit, and a positioning unit disposed on said first distal portion distal to the first upper end and extending in a first transverse direction, said positioning unit having a pivot member extending along said first transverse direction;

a leg member having a second upper end mounted pivotally on said pivot member for turning thereabout to move said leg member to an operative inclined position relative to said mounting wall in a second transverse direction when said back wall is tilted for forward movement of the suitcase body, or to move said leg member toward said mounting wall in said second transverse direction to a folded position where the back wall rests substantially vertically, said leg member having a bottom wheel adapted to roll on the ground when, said leg member is at said operative inclined position, a rear wall facing said mounting wall, and a front wall opposite to said rear wall in said second transverse direction and defining an opening between said second upper end and said bottom wheel for access to said mounting wall;

a locking unit disposed to be accessible via said opening, and including a retaining member and an engaging tongue respectively disposed on said rear wall and said mounting wall, said engaging tongue being disposed to be brought in said second transverse direction to engage and be retained in said retaining member once said leg member is moved to said folded position; and a first biasing member disposed to bias said engaging tongue to engage and be retained in said retaining member.

2. The supporting device as defined in claim 1, further comprising a lock releasing member disposed to be received in and movable relative to said opening in said second transverse direction, said lock releasing member having a depressing portion disposed to be brought to depress said engaging tongue against biasing action of said first biasing member when said lock releasing member is moved toward said mounting wall in said second transverse direction, and a second biasing member disposed to bias said lock releasing member toward said front wall in said transverse direction.

3. The supporting device as defined in claim 2, wherein said bottom wheel is swiveled relative to said second upper end.

4. The supporting device as defined in claim 2, further comprising a third biasing member disposed to bias said leg member to said operative inclined position.

5. The supporting device as defined in claim 2, wherein said lock releasing member has a faceplate extending out of said opening and frontward of said front wall and of such a dimension so as to cover said opening.

6. The supporting device as defined in claim 2, further comprising a latch member disposed on said rear wall of said leg member at an elevation below said opening and movable in said first transverse direction between a first position, where said latch member is disposed to be aligned with said lock releasing member in said second transverse direction and is latched relative to said depressing portion, thereby preventing pressing of said depressing portion, and a second position, where said latch member is cleared away from said depressing portion to permit pressing of said depressing portion against biasing action of said first biasing member.

7. The supporting device as defined in claim 6, wherein said front wall of said leg member has an elongate latch hole formed therethrough and extending in said first transverse direction, said latch member having an embossed portion disposed to extend therefrom in said second transverse direction and to protrude outwardly of said elongate latch hole so as to permit movement of said latch member between said first and second positions.

* * * * *